Dec. 26, 1944.    H. R. LIEBERT    2,365,827
RIGID AIRSHIP
Filed Aug. 5, 1941    3 Sheets-Sheet 1
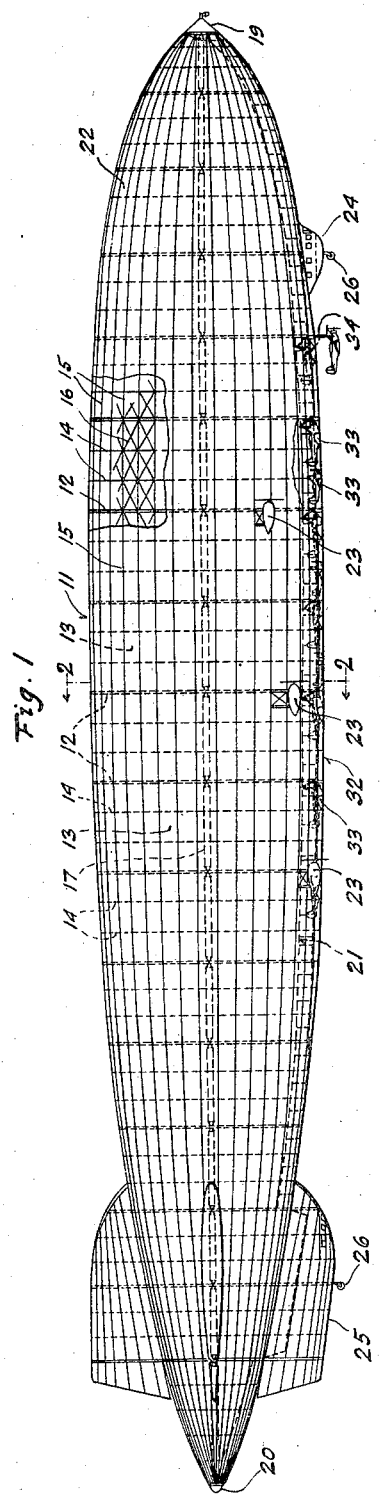
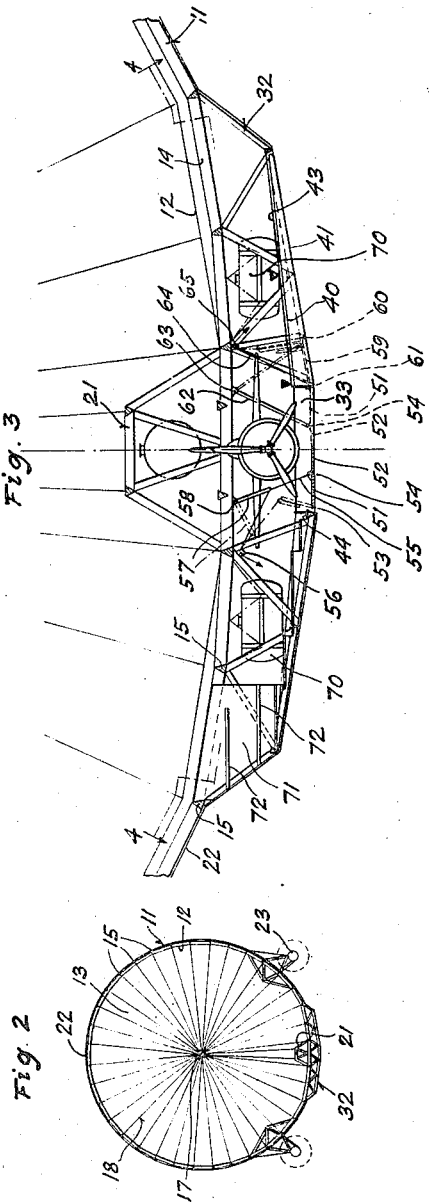
Inventor
HERMAN R. LIEBERT
Attorney Dec. 26, 1944.  H. R. LIEBERT  2,365,827
RIGID AIRSHIP
Filed Aug. 5, 1941  3 Sheets-Sheet 2
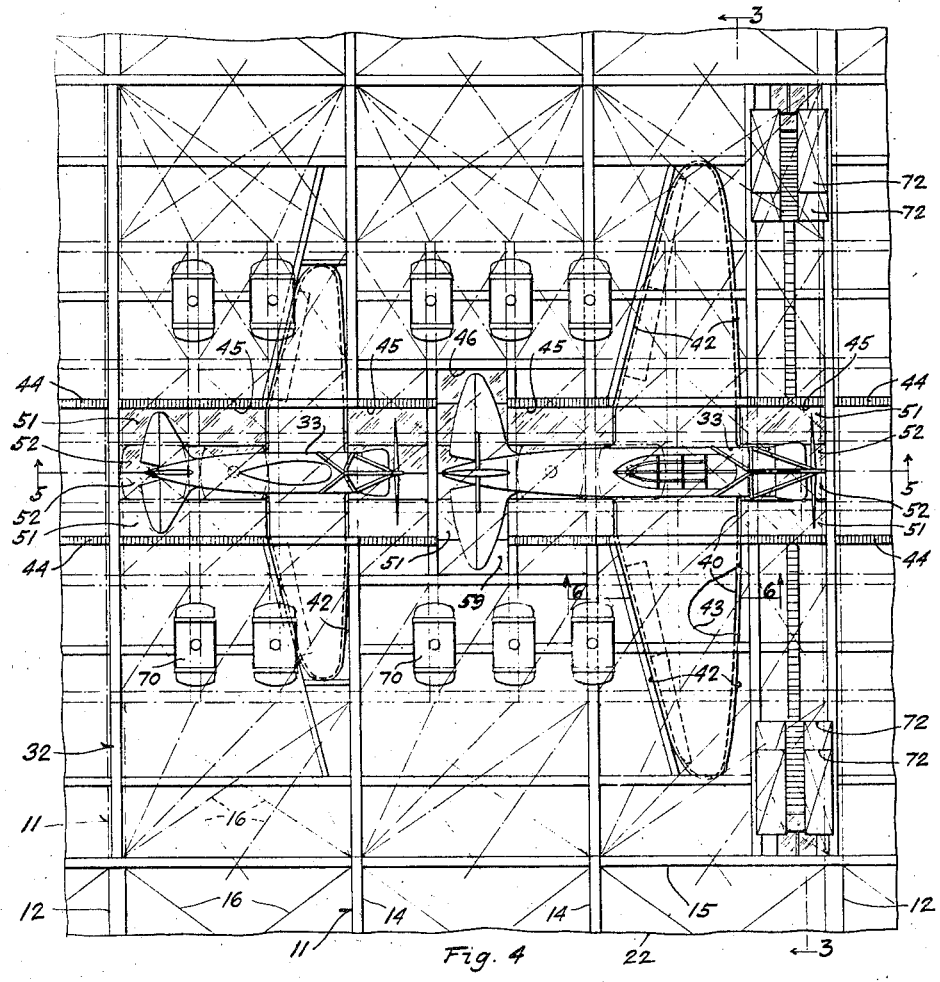
Fig. 4
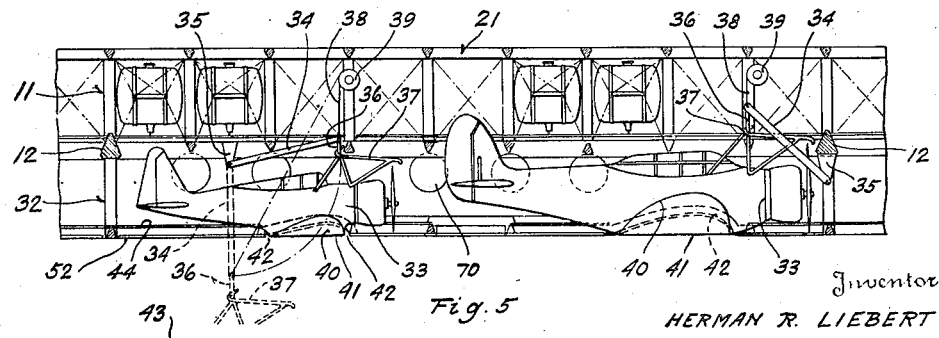
Fig. 5
Fig. 6
Inventor
HERMAN R. LIEBERT
By
Attorney

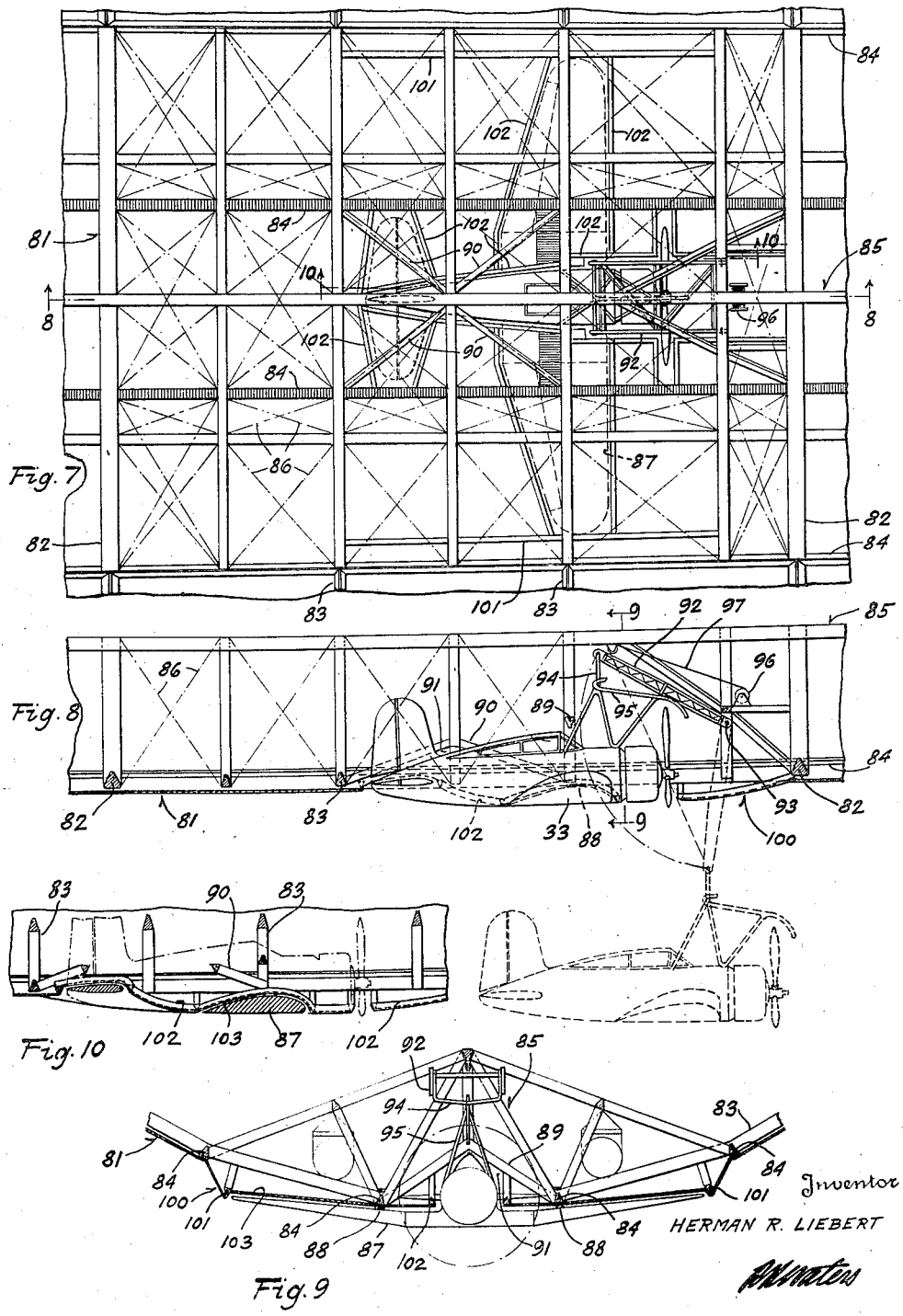

Patented Dec. 26, 1944

2,365,827

UNITED STATES PATENT OFFICE 2,365,827

RIGID AIRSHIP

Herman R. Liebert, Akron, Ohio, assignor to Wingfoot Corporation, Akron, Ohio, a corporation of Delaware Application August 5, 1941, Serial No. 405,513

11 Claims. (Cl. 244—2)

This invention relates to the construction of rigid airships and in particular to airships adapted for carrying airplanes.

One object of this invention is to provide means for carrying a plurality of airplanes on an airship in which each plane is provided with its own landing and launching device.

Another object of this invention is to provide means for carrying airplanes on an airship outside of its main hull structure in such a way that the air resistance of the airplane is minimized.

A further object of this invention is to provide means for carrying airplanes on an airship whereby portions of the airplanes are housed within the general contour of the main hull structure.

Airplane-carrying airships of hitherto known construction in which the airplanes are carried within the main hull structure had the disadvantage that large spaces and openings had to be provided in the main hull structure, whereby main stress carrying members had to be interrupted and special complicated truss work was required, in order to give the hull structure the necessary strength. In case airplanes were stored in large numbers inside, along the airship, they had to be launched in consecutive order and had to be shifted continuously when airplanes arrived or departed, since only one station was provided at which the airplanes could be taken on or launched. In the event a particular plane was to take off it was, under certain circumstances, rather difficult to move it to the launching position.

The present invention improves that condition and will be described with reference to the accompanying drawings of which:

Fig. 1 is a side view of a large rigid airship showing the general arrangement of the airplanes carried thereby.

Fig. 2 is a cross-section taken on the line 2—2 of Fig. 1.

Fig. 3 is an enlarged cross-section taken on the line 3—3 of Fig. 4.

Fig. 4 is a fragmentary plan view of a storage compartment viewed in the direction of 4—4 of Fig. 3.

Fig. 5 is a longitudinal section taken on the line 5—5 of Fig. 4.

Fig. 6 is a cross-section taken on the line 6—6 of Fig. 4.

Fig. 7 is a fragmentary plan view of a smaller type airship showing a modification of this invention.

Fig. 8 is a longitudinal section taken on the line 8—8 of Fig. 7.

Fig. 9 is a cross-section taken on the line 9—9 of Fig. 8.

Fig. 10 is a longitudinal section taken on the line 10—10 of Fig. 7.

Referring now to Figs. 1 and 2, the airship, as illustrated, is of Zeppelin type, in which 11 indicates the hull structure composed of main transverse frames or main rings 12, which divide the hull structure into gas cell compartments 13 which, in addition are formed by intermediate transverse frames or rings 14 and by longitudinals 15, all of which are united and provided with wire bracings 16 to prevent deformation of the hull structure. Central beams 17 extend between the bulkheads 18 of the main ring 12 from the bow 19 to the stern 20 of the airship hull. A keel structure 21 running along the bottom of the hull structure serves to carry various loads and to transmit them to the main rings. The hull structure is enclosed by a cover 22. Power cars 23, arranged in staggered position relative to each other, are mounted on the outside of the hull structure. The control car 24, as well as the lower fin 25, which serve as supports of the airship on the ground, are provided with landing wheels 26. Underneath the hull structure 11, which is somewhat flattened at the bottom (see Fig. 3), is a sub-structure 32 extending substantially from the control car 24 to the lower rear fin 25. This sub-structure has sufficient width and height to permit the airplanes 33, which in this case are shown of different sizes, to be fully retracted within the outer contour of the airship. Each airplane 33 is received on and launched from its own landing trapeze 34 (Fig. 5) which at one end is pivoted to brackets 35 and at its other end has suspended from it a yoke 36 swingably mounted. This yoke serves as a perch with which the hook-on device 37, rigidly mounted on the airplane, engages. When the airplane is in its retracted position it is still supported by the trapeze (see Fig. 5) which in turn is suspended by a cable 38 wound upon the winch 39, and its wings 40 with their lower surface 41, flush with the outer surface of the sub-structure 32. The wings fit into recesses 42 which are closed toward the interior by a cover 43 to exclude air from the inside of the ship. Catwalks 44 run along at both sides of the fuselage of the airplane between which are the open spaces 45 and 46 which permit moving the airplane into and out of the keel structure when necessary. The narrower openings 45 extend between the catwalks, as shown in Fig. 4 and are wide enough for the passage of the narrower portions of the planes. The openings 46 at the ends of the airplanes are made wider to accommodate the tails of the planes and, in this case, the catwalk is left off, but may be moved farther out if desired. The openings 45 are covered by folding doors, each of which is made in two sections 51 and 52, hinged at 53 and 54. The doors are constructed to fold inwardly by means of a cable 55 which leads over a sheave 56. A lever 57, pivoted at 58, to which the cable 55 is attached, serves to hold the door, which also is shown by dotted lines in folded condition, in the proper position (Fig. 3). The opening 46 is covered by doors consisting of three sections 59, 51 and 52, and hinged at 60, 61 and 54. A rod 62, pivoted at 63 to the structure and at 54 to the door, holds the door sections 51 and 52 in closed position, and a cable 64 attached to the door at 61 and leading over the sheave 65 supports the door section 59. This door also is indicated, in folded position, by dotted lines. As is readily seen, the airplanes in retracted position require the least possible space, since they are flush with the outer cover and the sub-structure is made just so high as absolutely necessary.

To utilize the space enclosed by the sub-structure as much as possible, fuel tanks 70, and the like, are arranged within, as well as crew quarters 71 with berths 72 which are advantageously located therein (Fig. 3). Since all heavy loads stored within the sub-structure are actually supported by the hull structure, the framework of the former can be made relatively light.

In a modification of this invention, illustrated by the Figures 7 to 9, the hull structure 81 of conventional cross-section comprises main rings 82, intermediate rings 83, longitudinals 84, and a keel structure 85, all of which are braced together by wires 86. In this case the airplane 33 penetrates, in retracted position, with its fuselage, the hull structure 81 as far as the wings 87, which rest against cushions 88 underneath the bottom longitudinals 84, will permit. For that purpose the bottom member 89 of the intermediate ring 83 and the diagonal girders 90 are drawn inwardly to form a recess 91 and also provide the necessary strength for the hull structure without interrupting important stress members like rings and longitudinals. A landing trapeze 92 pivoted at 93 to the keel structure 85 is provided with a yoke 94, which serves as a landing perch and which engages the landing device 95 of the airplane 33. The winch 96 lowers and raises the trapeze 92 by the cable 97. In its raised position the airplane parts extending underneath the hull structure are surrounded by a fairing 100, which is attached to the bottom of the hull structure and which forms, together with the airplane, a smooth outer surface, reducing the air resistance to a minimum. The size and shape of the fairing will depend upon the size and design of the plane used. The fairing structure substantially consists of the longitudinal girders 101 and girders 102, which latter mainly conform in their position to the contour of the airplane. A cover 103 substantially covers the space between the girders 101 to prevent air from entering the interior of the airship when the airplane is swung out or has taken off. Minor openings may be left open, or, where practical, closed by folding doors similarly as shown in Fig. 4.

In the event that a somewhat greater air resistance is permissible, a simplification of the construction can be made by omitting the fairing 100 entirely.

From the description of this invention it will be seen that airplanes can be carried by airships in a very practical and efficient way at minimum air resistance without resorting to having large openings in the hull structure which require interruption of important members, like longitudinals and intermediate rings. It is to be understood that the illustrations on the accompanying drawings are only shown by way of example and shall not limit this invention, but that any departure therefrom within the spirit and scope of this invention, shall be considered on the merit of the appended claims.

What I claim is:

1. In combination a rigid airship and a plurality of airplanes suspended therefrom by retracted retractable landing means, the airplanes being located in recesses in the bottom of the airship, said airplanes substantially filling and closing the recesses with the under surface of the wings of the airplanes substantially flush with the bottom of the airship, and forming substantially a continuation of the outer contour thereof.

2. In a rigid airship, a hull structure, a sub-structure attached to the outside of said hull structure and having a recess therein adapted completely to receive an airplane within the contour of the substructure and means for holding the airplane with the under surface of the main wing of the airplane being substantially flush with the bottom of the substructure.

3. In a rigid airship a hull structure, a sub-structure attached to the outside of said hull structure with openings therein, an airplane in each of a plurality of said openings with the under surface of the wings of the airplanes substantially flush with the bottom of the sub-structure, and forming the outer surface thereof, said sub-structure being as wide as the airplane wings, and retracted retractable landing means attached to the hull structure and supporting each airplane.

4. A rigid airship with a hull structure divided into compartments by main rings, a sub-structure attached to the outside of the hull structure and extending over at least one compartment, an opening in the bottom of the sub-structure, a retractable landing means adapted to lift a portion of an airplane through the opening and to support it with the bottom of the wings of the airplane substantially flush with the floor of the sub-structure so that the wings provide a continuation of the outer surface of the sub-structure.

5. In a rigid airship a hull structure with a sub-structure attached thereto adapted for storing a plurality of airplanes, airplane-shaped openings in the bottom of the sub-structure through which at least the upper portions of said airplanes are lifted when the planes are stored, and pivoted retractable trapeze landing means contained entirely within the sub-structure, and means for retracting and extending the landing means through the opening with an airplane supported thereby.

6. In a rigid airship, main rings dividing the hull into gas cell compartments, and rings intermediate said main rings, an opening in the bottom of at least one of said intermediate rings with suitable bracing therefor located above the opening and retractable landing means attached to the airship, adapted to lift an airplane so as to bring the fuselage thereof into said opening and to bring the bottom of the wings of the airplane substantially flush with the bottom of the hull.

7. A rigid airship of the lighter than air type and having an opening in its bottom which opening in plan view is similar to but slightly larger than the plan contour of an airplane, a plurality of pairs of multi-part doors having longitudinally extending pivots for closing the opening, means for folding the doors inwardly to open them, pivoted trapeze means mounted adjacent each opening and adapted to support an airplane, means for moving the last-named means to move an airplane into or out of the opening and for holding the airplane so that the bottom of the airplane is substantially flush with the bottom of the airship so that the wings form substantially a continuation of the surface thereof and the airplane is supported within the contour of the airship, and rest means against which the airplane is held when in the opening.

8. A rigid airship of the lighter than air type and having an opening in its bottom which opening in plan view is similar to but slightly larger than the plan contour of an airplane, pivoted trapeze means mounted adjacent each opening and adapted to support an airplane, means for moving the last-named means to move an airplane into or out of the opening and for holding the airplane so that the bottom of the airplane is substantially flush with the bottom of the airship and forms substantially a continuation of the surface thereof and the airplane is supported within the contour of the airship, and rest means against which the airplane is held when in the opening.

9. A rigid airship of the lighter than air type and having an opening in its bottom, a plurality of pairs of multi-part doors having longitudinally extending pivots for closing the opening, means for folding the doors inwardly to open them, means mounted adjacent each opening and adapted to support an airplane, and means for moving the last-named means to move an airplane into or out of the opening and for holding the airplane so that the bottom of the airplane is substantially flush with the bottom of the airship and forms a continuation of the surface thereof and the airplane is supported within the contour of the airship.

10. A rigid airship of the lighter than air type and having an opening in its bottom which opening in plan view is similar to but slightly larger than the plan contour of an airplane, a plurality of doors for closing the opening, means mounted adjacent each opening and adapted to support an airplane, and means for moving the last-named means to move an airplane into or out of the opening.

11. A rigid airship of the lighter than air type and having an opening in its bottom which opening in plan view is similar to but slightly larger than the plan contour of an airplane, means mounted adjacent each opening and adapted to support an airplane, means for moving the last-named means to move an airplane into or out of the opening, and rest means against which the airplane is held when in the opening.

HERMAN R. LIEBERT.